(12) United States Patent
Dasher et al.

(10) Patent No.: US 9,183,312 B2
(45) Date of Patent: Nov. 10, 2015

(54) IMAGE DISPLAY WITHIN WEB SEARCH RESULTS

(71) Applicant: Google Inc., Mountain View, CA (US)

(72) Inventors: Grant Dasher, Cambridge, MA (US); David R. H. Miller, Newton, MA (US)

(73) Assignee: Google Inc., Mountain View, CA (US)

( * ) Notice: Subject to any disclaimer, the term of this patent is extended or adjusted under 35 U.S.C. 154(b) by 158 days.

(21) Appl. No.: 13/795,397

(22) Filed: Mar. 12, 2013

(65) Prior Publication Data

US 2015/0161268 A1    Jun. 11, 2015

Related U.S. Application Data

(60) Provisional application No. 61/613,132, filed on Mar. 20, 2012.

(51) Int. Cl.
    *G06F 17/30* (2006.01)
(52) U.S. Cl.
    CPC .... *G06F 17/30867* (2013.01); *G06F 17/30244* (2013.01); *G06F 17/30864* (2013.01)
(58) Field of Classification Search
    CPC .............. G06F 17/30864; G06F 17/30244
    See application file for complete search history.

(56) References Cited

U.S. PATENT DOCUMENTS

| 8,407,207 B1 | 3/2013 | Chen et al. | |
|---|---|---|---|
| 2005/0171946 A1* | 8/2005 | Maim | 707/5 |
| 2005/0210017 A1* | 9/2005 | Cucerzan | 707/3 |
| 2005/0246332 A1* | 11/2005 | Wang et al. | 707/3 |
| 2006/0074898 A1* | 4/2006 | Gavalda et al. | 707/4 |
| 2008/0059456 A1* | 3/2008 | Chowdhury et al. | 707/5 |
| 2010/0153143 A1* | 6/2010 | Baggett et al. | 705/5 |
| 2010/0306193 A1* | 12/2010 | Pereira et al. | 707/728 |
| 2010/0306235 A1* | 12/2010 | Mishne | 707/769 |
| 2011/0213766 A1* | 9/2011 | Hong et al. | 707/718 |
| 2012/0011142 A1* | 1/2012 | Baheti et al. | 707/769 |

* cited by examiner

Primary Examiner — Mohammad S Rostami
(74) Attorney, Agent, or Firm — Fish & Richardson P.C.

(57) ABSTRACT

Methods, systems, and apparatus, including computer programs encoded on a computer storage medium, for displaying search results referencing resources of two different types. In an aspect, a search system receives a search query for a search of a first resources. The search system determines a second resource score for the search query. The second resource score is measure of relatedness of the query to the second resources and is independent of a search property ratio of the query. If the second resource score meets a threshold, then the search system conducts a full search of second resources in addition to the search of the first resources.

15 Claims, 6 Drawing Sheets

IMAGE DISPLAY WITHIN WEB SEARCH RESULTS

CROSS-REFERENCE TO RELATED APPLICATIONS

This application claims the benefit under 35 U.S.C. §119(e) of U.S. Patent Application No. 61/613,132, entitled "IMAGE DISPLAY WITHIN WEB SEARCH RESULTS," filed Mar. 20, 2012, which is incorporated herein by reference in its entirety.

BACKGROUND

This specification relates to search query processing.

The Internet provides access to a wide variety of resources, for example, webpages, image files, audio files, and videos. A search system selects one or more resources in response to receiving a search query that a user submits to satisfy the user's informational needs. The search queries are usually in the form of text, e.g., one or more query terms. The search system selects and scores resources based on their relevance to the search query and on their importance relative to other resources, and provides search results that link to the selected resources. The search results are typically ordered according to the scores and presented according to this order.

The different types are resources are often indexed according to a corpus, and search engines are used to search these corpora. As used herein, a corpus is a collection of resources. Each corpus can include resources of one or more types. For example, a general web corpus can include HTML documents, images documents, videos, etc., while an image corpus, on the other hand, can be limited to a collection of images and metadata for the images. Thus there are different types of corpora that a search engine searches. For example, a search engine searches a general resource corpus index to search resources based on the textual content of the resources and relative authority ratings of the resources. Search results resulting from a search of the general resource corpus index typically include a title of the resource, a snippet of text from the resource, and a link to the resource. Likewise, a search engine searches an image corpus index to search for images that are responsive to a search query. The image corpus index may index the images based on labels (or text) associated with the images, similarity of the images to other images, click through rates of images with respect to queries, and authority ratings of the images. Search results resulting from a search of the image corpus index typically include a thumbnail version of the image, an embedded link to the image, or a web page in which the image is referenced, and optionally label text associated with the image.

Most search engines provide the users options to search a particular corpus. Some search engines, however, provide search results for different corpora if the query is indicative of those different corpora. For example, a search engine may provide image search results with general web search results, even though the query was submitted for a search of the general web corpus. Typically the search results for the other corpus (or corpora, if multiple corpora are searched) are shown in a fixed configuration display area and show a fixed number of search results identifying resources in the other corpora that are responsive to the search query.

One way that a search system decides to search a second corpus during a search of a first corpus is to evaluate an "intent" of a query. For example, a query submitted for a search of a general web corpus may have a high "image intent" (e.g., the query may read "puppy photos"). One way of determining an intent of a query is to analyze the history of the query and for which corpora users submitted the query for searches. However, if a query is unique or occurs relatively infrequently in a search volume of queries (commonly referred to as a "long tail" query), then discerning the intent of the query may be impossible, or subject to a high degree of error.

SUMMARY

In general, one innovative aspect of the subject matter described in this specification can be embodied in methods that include the actions of accessing an index of first and second resources, the first resources being resources that are different from the second resources; receiving queries for respective searches of the first resources; for each query, initiating a search of the first resources, and receiving, in response to the search, first search scores of the first resources, each first search score corresponding to a first resource and being indicative of the relevance of the first resource to the query; selecting, by the data processing apparatus, at least a proper subset of the queries and for each of the queries in the selected proper subset of queries determining a second resource score of the query, the second resource score of the query being determined independent of a search property ratio of the query; for each query in the proper subset of queries, comparing, by the data processing apparatus, the second resource score of the query to a second resource score threshold; for only each query having a second resource score that meets the second resource score threshold: initiating a search of the second resources for the query and receiving, in response to the search, second search scores of second resources in the proper subset of second resources, each second search score corresponding to a second resource and being indicative of the relevance of the second resource to the query; determining an insertion score that defines an ordinal insertion position at which second resource search results referencing second resources are to be inserted into a ranking of first resource search results referencing first resources; and generating a search results resource for displaying the first resource search results according to their respective ordinal positions in the ranking and the second resource search results at the ordinal insertion position. Other embodiments of this aspect include corresponding systems, apparatus, and computer programs, configured to perform the actions of the methods, encoded on computer storage devices.

Another innovative aspect of the subject matter described in this specification can be embodied in methods that include the actions of accessing an index of first and second resources, the first resources being resources that are different from the second resources; for each indexed first resource: selecting, from a query log, queries for which search results referencing the first resource were selected at a user device in response to the queries; for each of the queries, accessing data specifying an actual search property ratio for the query, the actual search property ratio being a ratio of a first number of times the query was used to search first resources and a second number of times the query was used to search second resources; and determining, by the data processing apparatus, a resource search property ratio score for the first resource based on the actual search property ratios of each of the queries; identifying websites hosting the first resources, each website hosting one or more of the first resources; determining, for each of the websites, a website search property ratio based on the actual search property ratios of each of the queries for which search results referencing the first resource hosted on the website were selected. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Limiting processing during an initial probe phase to a proper subset of second resources conserves processing resources. The results of the probe phase are used to determine whether to search all resources of the second type, and thus complete searches of resources of the second type are only done if a measure of relatedness of the query to the second resources (referred to as a "second resource score") meets a threshold, resulting in an efficient utilization of system resources. Thus, the likelihood of satisfying users' informational needs is increased without a concomitant increase in demand for system resources.

As the query history for a particular long tail query increases, the system is better able to accurately model the intent of the query using existing intent models. Accordingly, the system begins to "trade off" the inferred interest measures to actual interest measures. Thus as the query transitions out of the long tail, the scoring resulting from existing modeling processes for frequently occurring queries becomes more authoritative. Accordingly, a query need not have a minimum history from which its intent may be measured; instead, it is possible from the first instance of the query to infer an intent for particular types of other resources, and to service searches of the other resources at the first instance of the query. Again, this increases the likelihood of satisfying users' informational needs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes technologies relating to search query processing for displaying search results for second resources with search results for first resources that are different from the second resources. In this specification an example context of displaying image search results with general web search results is used; however, the systems and methods described in this specification are applicable to determining whether to display search results of any type of second resources with search results of any type of first resources that are different from the second resources.

In an example implementation, a search system receives a search query from a user device for a search of a general resource index (a search of "first resources", e.g., web pages). The search system determines whether a search for images ("second resources") should be conducted with the search of the general resource index. If the query has a sufficient history from which an image intent can be determined, then the system processes an image search for the query if the image intent of the query exceeds a threshold.

If, however, the query does not have a sufficient history from which an image intent can be determined (or the confidence of the image intent does not meet a confidence threshold), then the system generates an image score (also referred to as a "second resource score" in the generalized case) from resources that are determined to be responsive to the query. The image score is a measure of the relatedness of images to the query. In some implementations, the resources that are used to generate the image score are determined from a search of a proper subset of available resources to conserver system resources. If the image score meets a threshold, then the system processes an image search for the query.

To insert the image search results into the general search results, the system determines an insertion score. The insertion score is proportional to a search property ratio for the query. For queries with a sufficient history, an actual search property ratio can be determined from the respective corpora searched by the query. However, for long tail queries, an actual search property ratio may be inaccurate or indeterminate. Thus, for long tail queries, the system determines an insertion score based on search property ratios determined for resources (resource search property ratio) and websites hosting the resources (website search property ratios). The resource and website search property ratios, which are also referred to as "inferred search property ratios," are determine from the search property ratios of other queries that were used to identify the resources.

In some implementations, the insertion score for image search results is the result of a weighting of a first insertion score based on the actual search property ratio and a second insertion score based on the inferred search property ratios. As the query transitions out of the long tail, the weighting causes the first insertion score to become more authoritative in determining the insertion score. Conversely, for long tail queries, the second insertion score is more authoritative.

These features and other features are described in more detail below.

Example Search System Environment

Figure 1A:
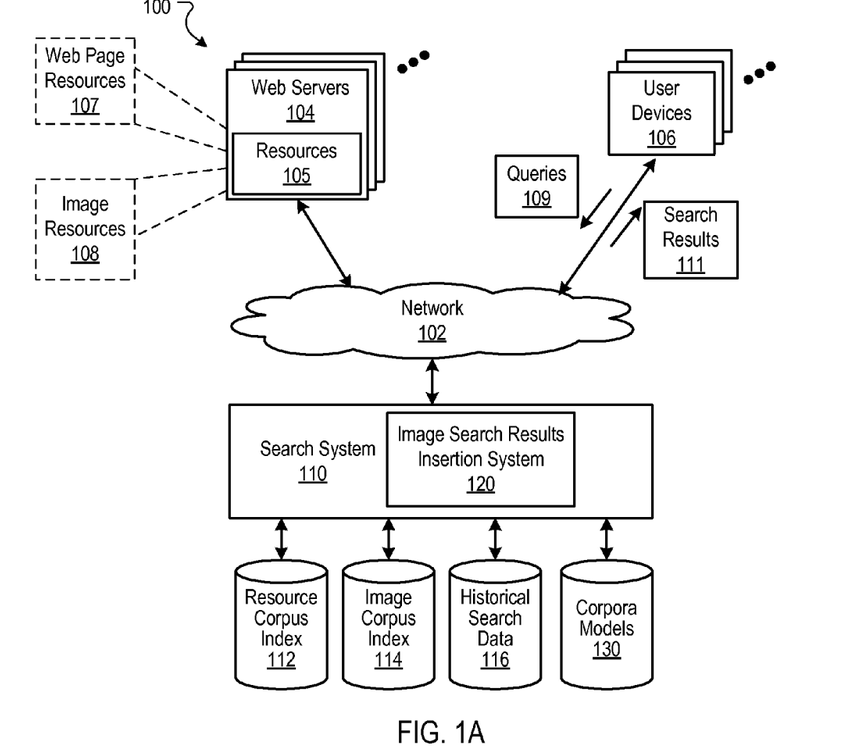
FIG. 1A is block diagram of an environment in which a search engine provides search services.

FIG. 1 is a block diagram of an example environment 100 for a domain video scoring system 120. The example environment 100 includes a network 102, e.g., a local area network (LAN), wide area network (WAN), the Internet, or a combination of them, that connects servers 104, user devices 106, and the search system 110. The environment 100 may include many thousands of servers 104 and user devices 106.

A web site 104 is a one or more resources 105 associated with a domain name, and each web site is hosted by one or more servers. An example web site is a collection of webpages formatted in hypertext markup language (HTML) that can contain text, graphic images, multimedia content, and programming elements, such as scripts. Each web site 104 is maintained by a publisher, e.g., an entity that manages and/or owns the web site.

Two particular types of resources are webpage resources 107 and image resources 108. Each resource type is associated with a resource address, such as a URL. Webpage resources include text and may also include links to other types of resources that are rendered and displayed with the text of the webpage resource. In particular, image resources 108 are often rendered with webpage resources 107. An example of an image resource 108 is data that is used to render an image of a subject. While image resources are typically included in webpage resources 107, they can also be hosted as separately addressable resources.

To facilitate searching of these resources 105, the search engine 110 identifies the resources by crawling the publisher web sites 104 and indexing the resources provided by the publisher web sites 104. In some implementations, the indexes are stored in a resource corpus index 112 and an image corpus index 114. The indexes 112 and 114 are shown as separate indexes. However, in some implementations, the indexes can be combined in a single index, and a search for a respective corpus can be constrained to the portion of the combined index that is used to index the respective corpus, and/or based on a particular search process specific to the corpus. For example, for a combined, single index, the searching of web pages may entail a first search algorithm and scoring process to search the index, and the searching of image resources may entail a second search algorithm and scoring process that is different from the first to search the index.

A user can specify which corpus to search. For a search of the first resources (web pages), the resource corpus index 112 is searched, and resources are ranked based on information retrieval ("IR") scores that measure the relevance of the resource to the query, and optionally an authority score of each resource relative to other resources, and perhaps other appropriate search scores, depending on the search system used. The search results are ranked based on relevance scores that are a combination (e.g., sums, products, or other mathematical combinations) of these constituent search scores. The search results 111 are ordered according to these relevance scores and provided to the user device according to the order.

For a search directed to images that uses a text query as input, the search system 110 accesses the image corpus index 114. In some implementations, the search system 110 determines a relevance score for an image (e.g., relevance with respect to label data for an image, and/or other techniques for determining relevance of an image to a textual query) and combines the score with a relevance feedback score of the image. An example relevance feedback score is a score derived from a click-through rate of an image when that image is referenced in an image search result.

The user devices 106 receive the search results, e.g., in the form of one or more webpages, and render the pages for presentation to users. In response to the user selecting a link in a search result at a user device 106, the user device 106 requests the resource identified by the link. The web site 104 hosting the resource receives the request for the resource from the user device 106 and provides the resource to the requesting user device 106.

Search queries 109 submitted during user sessions are stored in a data store such as the historical search data store 116. Selection data specifying actions taken in response to search results provided are also stored in the historical data store 116. The data stored in the historical data store can be used to map search queries 109 submitted during search sessions to resources that were identified in search results 111, and the actions taken by users. Data stored in the historical search data store 116 may be anonymized so that personal identifying information is removed, thus protecting the privacy of users.

The search results are data generated by the search system 110 that identifies resources that are responsive to a particular search query. Each search result includes a link to a corresponding resource, e.g., a link to a webpage for a general search result, or link to an image for an image search result. An example general search result includes a webpage title, a snippet of text, and a URL of the webpage. An example image search result includes a thumbnail of an image, a URL of the webpage in which the image is referenced, and, optionally, labeled data describing the subject of the image.

Image Search Results

As described above, the search system 110 allows users to specify which corpus is to be searched for a search query. For example, the search system 110 may present, by use of user interface, and input menu that allows the user to select the resource corpus index 112, or the image corpus index 114 when submitting a search query. For example, if the user is solely interested in images, the user may select the image corpus index 114 for searching. Conversely, if the user is interested primarily in text articles, the user may elect to search only the resource corpus index 112. While there is overlap between the indexes 112 and 114, e.g., images may be indexed in both the image corpus index 114 and the resource corpus index 112, the search system 110 uses different search processes for each respective index 112 and 114.

Often, however, the user does not specify which index to use when searching. By default, the emphasis of the search is typically on the resource corpus index 112. Accordingly, a user that may be interested in both images and articles may not be provided with search results that link to some resources that would satisfy the user's informational needs. However, a user's informational need with respect to a corpus to search can often be inferred from the search query. In particular, some search queries may indicate that a user is searching for a particular type of content indexed in a particular corpus. For example, for the search query "llama fencing," there may only be a few high-quality images that are responsive to the query, but there are many webpages that are very responsive to the query. Additionally, historical search data may indicate that most users select general search results in response to the query "llama fencing," and very few image search results are ever selected. Conversely, for another query, there may be many high-quality images that are responsive to the query, and the historical search data may indicate that many users select image results in response to this query.

The search system 110 includes an image search results insertion system 120. As described above, the insertion system 120 determines an image intent for a search query. If the image intent meets an intent threshold, then the search system 110 searches the image corpus index 114 and generates image search results for inclusion with the general search results.

Figure 2A:
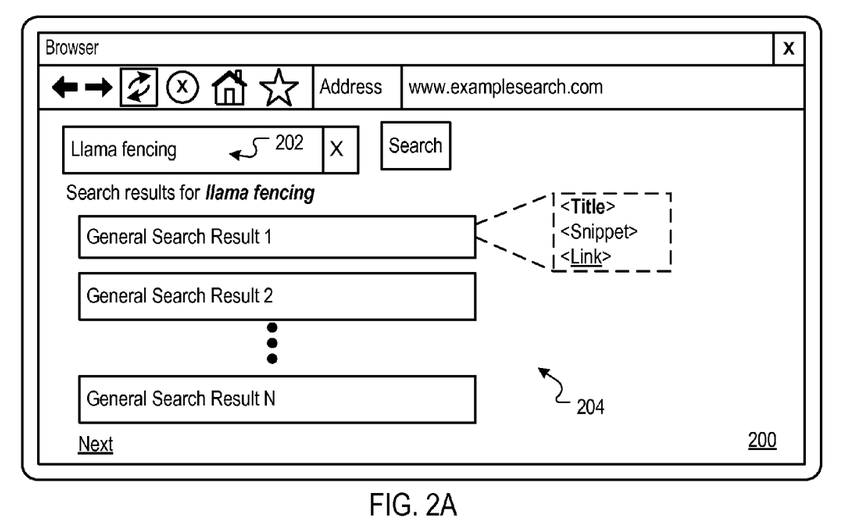
FIGS. 2A and 2B are illustrations of search results pages.
Figure 2B:
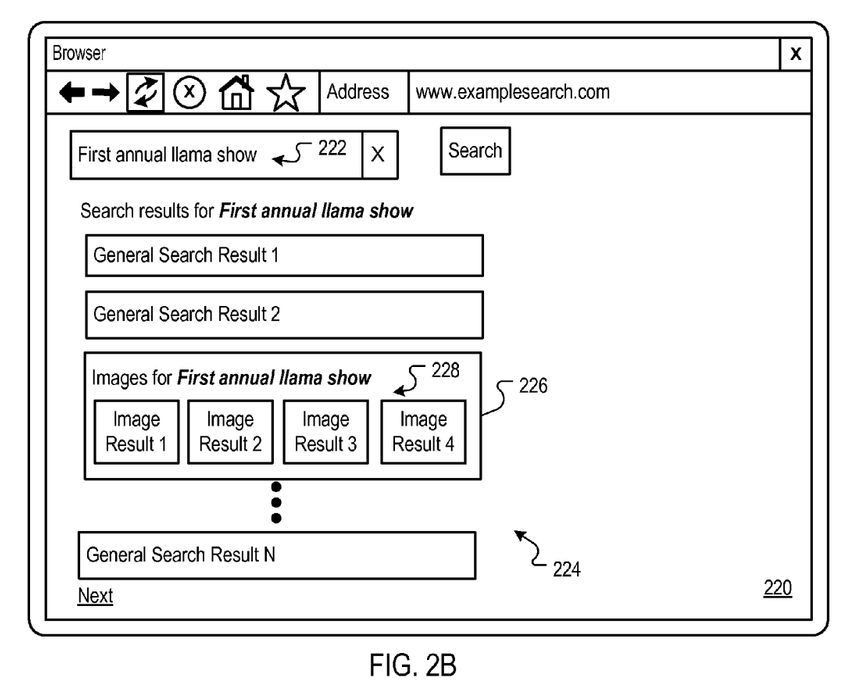

This feature is illustrated with respect to FIGS. 2A and 2B, which are illustrations of search results pages 200 and 220. The search results page 200 is a page returned in response to the query 202 ("llama fencing"). For this query, there are few high-quality images that are responsive to the query, but there are many webpages that are very responsive to the query. For example, very few images may be associated with labeled data that are relevant to the query "llama fencing." Additionally, those images that are associated with the labeled data that are relevant to the query "llama fencing" may have relatively low click through rates for the query. Finally, the query "llama fencing" may be submitted by users for a search of the resource index 112 much more frequently than for search of the image corpus index 114. The insertion system 120 can account for some or all of these facts to determine whether the query "llama fencing" meets an image intent threshold.

For the search results page 200, the search system 110 determined that the query "llama fencing" does not meet an image intent threshold. Accordingly, only general search results 204 are provided. Each search result 204 includes a title of a webpage, a snippet of text that is relevant to the search query 202, and a link to the webpage.

For query that meets an image intent threshold, the search system 110 returns a search results page with image search results displayed in an image display environment. The search results page 220 of FIG. 2B is an example results pages for a query that meet an image intent threshold. In particular, the image intent for the query 222 ("first annual llama show") has been determined to meet a threshold image intent, and a set 226 of image search results 228 are shown at an ordinal position determined by an insertion score.

For most queries, the insertion system 120 determines the intent score and subsequent scores based on an appropriate corpus model 130. Each corpus model 130 may take into account various factors specific to the corpus to which it corresponds. One such factor is a search property ratio. A search property ratio for a particular corpus is a value that is proportional to a number of times the search query was submitted for a search of the particular corpus to a number of times that the search query was submitted for a search of a different corpus or different corpora. For example, the image search property ratio of a query submitted for a search of the resource corpus 112 is the number of times the search query was submitted for a search of the image corpus 114 to a number of times that the search query was submitted for a search of the web corpus 112.

Figure 1B:
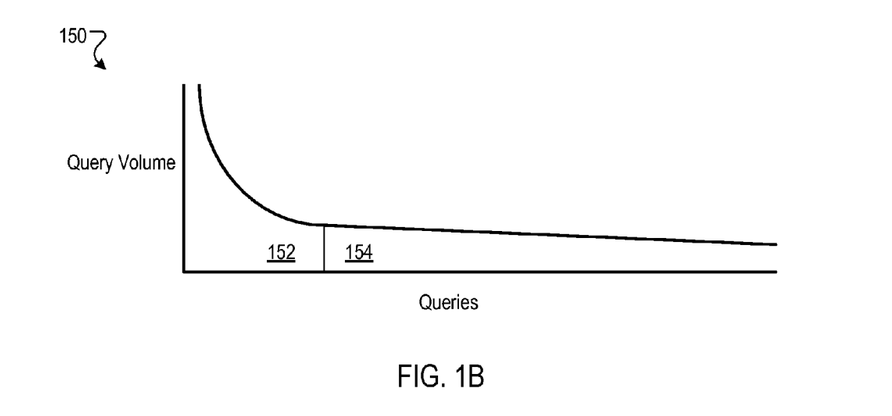
FIG. 1B is a graph of a query volume distribution.

Search property ratios can be accurately measured for queries with a sufficient history in the historical search data 116. However, for long tail queries, search property ratios may be highly inaccurate due to the lack of historical data. The concept of a long tail query is illustrated in FIG. 1B, which is a graph 150 of a query volume distribution. The queries that occur in the region 152 are queries that occur relatively often when compared to the queries that occur in the region 154. The search volume of queries in the region 154 asymptotically approaches zero, and thus the graph depicts a "long tail" of low search volume queries. Typically, query intent can be accurately determined for the queries in the region 152, but may be very inaccurate for queries in the region 154.

The distinct line separating the regions 152 and 154 is illustrative only and not necessarily indicative of the actual data. Typically, the separation between the regions 152 and 154 occurs across a band of queries, as the queries and volume of queries are constantly varying over time.

Returning now to FIG. 2B, assume that the query "first annual llama show" is the first instance of the query received by the search system 110 (or the query has been received so few times that an accurate corpus model 130 for the query is not available). Because the query intent may not be readily determined from the historical data, the insertion system 120 cannot use the existing corpus model for images to determine whether and where to provide image search results. The insertion system 120 could be configured to automatically process the query for an image search to determine if quality images are available; however, the amount of additional search processing resources that would be required for each long tail query could be prohibitively expensive. Furthermore, processing an image search for each long tail query is not an efficient use of computing resources.

To efficiently utilize computing resources to determine whether a long tail query submitted for a search of a first corpus should also be used to search a second corpus efficiently, the insertion system 120 determines a second resource score for the query. The second resource score is a measure of relatedness of the query to the second resources. If the second resource score meets a threshold, then a triggering module in the insertion system 120 causes the search of the second corpus to be performed. Here, the query "first annual llama show" had a second resource score (e.g., and image score because the second resources are images) that met the threshold, and an image search was thus done to identify the images and generate the image search results 228.

Operation of the insertion system 120 is described in more detail with reference to FIGS. 3-7 below.

Image Search Results Insertion System

Figure 3:
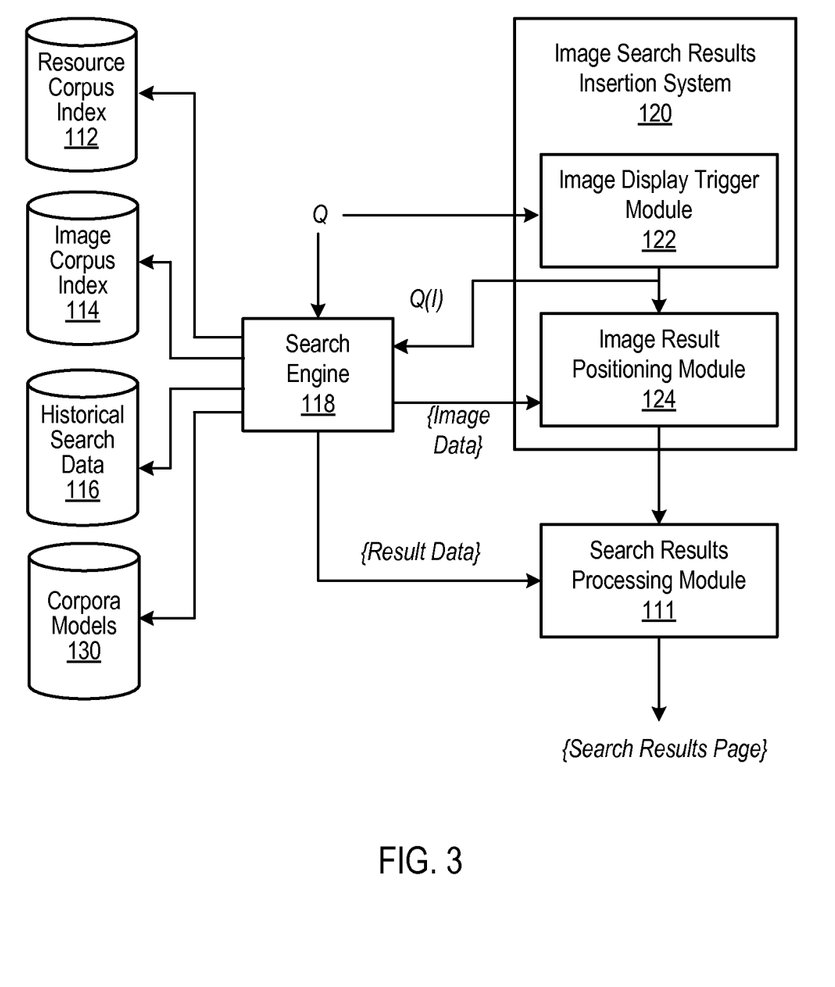
FIG. 3 is a block diagram of an example implementation of an image search results insertion system.

FIG. 3 is a block diagram of an example implementation of an image search results insertion system 120. The image insertion system 120 inserts image search results into a listing of general search results. More generally, the insertion system 120 inserts search results for second resources into the search results of first resources that are of a different type than the type of the second resources. The architecture of the insertion system 120 is illustrative only, and other architectures that distribute the described functionalities in a different manner among different processing stages can also be used.

Figure 4:
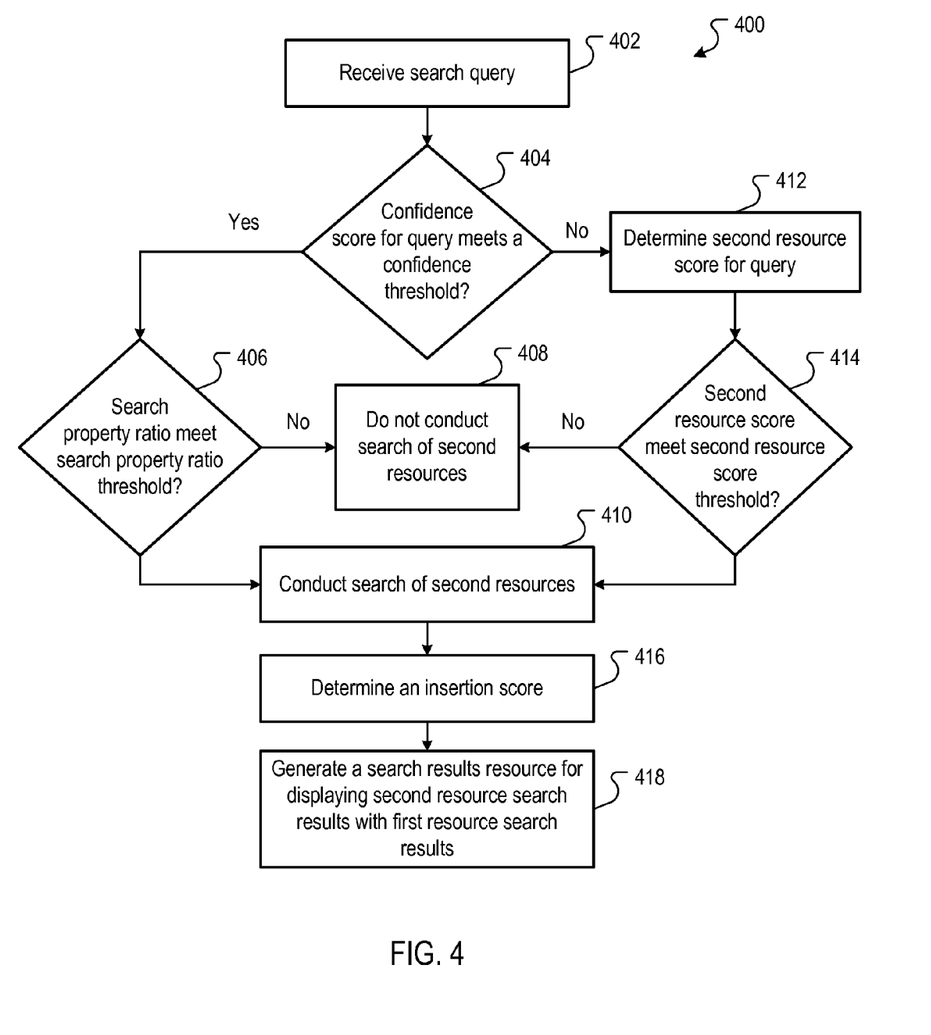
FIG. 4 is a flow diagram of an example process for determining resource scores for queries and performing searches according to the resource scores.

Operation of the insertion system is described with reference to FIG. 4, which is a flow diagram of an example process for determining resource scores for queries and performing searches according to the resource scores.

The insertion system 120 receives a search query (402). For example, the user of the user device 106 may submit a search query of one more terms to a search engine 118. The search engine 118, in turn, provides the query to an image displayed trigger module 122. The trigger module 122 is used to determine a resource score for the query.

The search query is also used to search the first resources. The first resources are scored by first search scores. Each first search score is indicative of the relevance of a first resource to the query.

The image trigger display module 122 determines whether a confidence score for the query meets a confidence threshold (404). For example, if the query is not a long tail query, and has sufficient historical data from which an image intent can be determined (e.g., there is enough information to accurately determine a search property ratio), then the confidence threshold is met. Otherwise, the confidence measure is not met.

Assuming the query confidence score meets the threshold, the image trigger display module 122 determines whether the search property ratio of the query meets a search property ratio threshold (406). If the search property ratio threshold is not met, then the system 120 does not conduct a search of the second resources (e.g., the system does not conduct an image search) (408). If, however, the search property ratio does meet the threshold, then the system 120 conducts a search of the second resources (410).

Returning to step 404, if the query confidence score does not meet the threshold, then the system determines a second resource score for the query (412). The second resource score of the query is a measure of the relatedness of the query to second resources, and is used to determine whether to commit system resources for a search of the second resources. Thus, for the proper subset of long tail queries, the insertion system 120 can determine for each of these queries whether to conduct a search of the second resources based on the second resource score.

Figure 5:
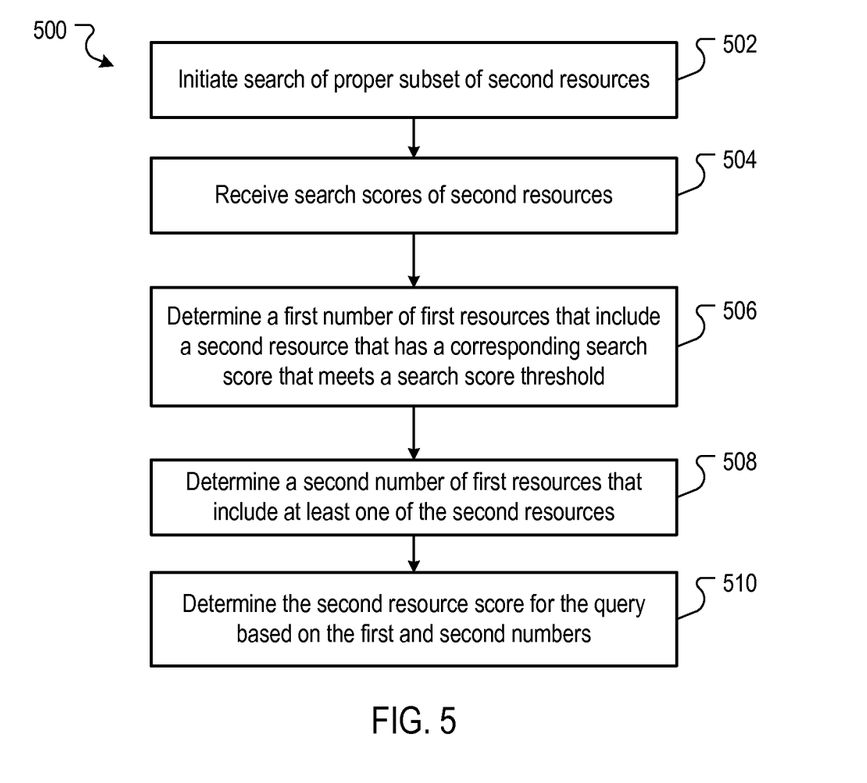
FIG. 5 is a flow diagram of an example process determining a resource score for a query.

One example process by which a second resource score is determined is described with respect to FIG. 5, which is a flow diagram of an example process 500 determining a resource score for a query. The process 500, for each query for which the query confidence score does not meet the threshold, initiates a search of a proper subset of second resources (502). For example, in some implementations, the indexes are sharded among processing leaf nodes, where each leaf node processes a portion of the indexes. For a subset of the leaf nodes, a search for second resources is conducted. For example, for an image search, a search in approximately X % of the leaf nodes is conducted. In various implementations, X may range from as little as 1% up to 25%.

In some implementations in which the index is a combined index, the system can leverage off the scoring of the first resources resulting from the search of the first resources. For example, if the first resources are web pages and the second resources are images, then the scored web pages in the selected X % of the leaf nodes are selected, and images on those web pages are scored using an image scoring algorithm.

The process 500 receives search scores of second resources (504). Each search score for the query corresponds to a second resource and is indicative of the relevance of the second resource to the query.

The process 500 determines a first number of first resources that include a second resource that has a corresponding search score that meets a search score threshold (506). For example, in some implementations the indexes 112 and 114 are used to map images to web page resources. In these implementations, the process 500 determines, from the scored proper subset of images, how many web pages include at least one of the images with search score that meets the threshold. For example, assume that 1,000 images are scored, and that the 1,000 images are distributed among 500 web pages. Of those 500 web pages, 300 include at least one of the 1,000 images that have a score that exceeds the search score threshold.

A variety of search scores can be used for thresholding. For example, the search score can be based on one or more of an image selection rate that is a measure of image search result selection of image search results referencing the image, an image topicality score that is a measure of topical relatedness of the image to the query, and an image relevance score based on one or more of image features and labels, to name just a few.

The process 500 determines a second number of first resources that include at least one of the second resources (508). For example, as described above, the 1,000 images are distributed among 500 web pages, and thus the second number is 500.

The process 500 determines the second resource score for the query based on the first and second numbers (510). For example, in some implementations, the process determines a ratio of the first number to the second number. In the example above, the ratio is 300/500, or 0.6, and thus the second resource score is 0.6.

In a variation of the process 500, the system can, for example, determine how many web pages are scored (or at least have a first search score that meets a minimum relevance threshold) in response to the query, and use this value as the denominator. Returning the example above, assume that 2,000 web pages are determined to meet this alternate criterion. Accordingly, given that 300 web pages include at least one of the 1,000 images that have a score that exceeds the search score threshold, the second resource score is 300/2,000, or 0.15.

Returning now to FIG. 4, the process 400 determines whether the second resource score meets a second resource score threshold (414). The second resource score threshold may be selected based on a variety of factors, such as how aggressive (or conservative) the system should be in provided search results for the second resources. For example, for the resource score computed by the process 500 of FIG. 5, a threshold in the range of 0.1-0.7 can be used. Other threshold values can also be used.

If the second resource score is not met, then the system 120 does not conduct a search of the second resources (e.g., the system does not conduct an image search) (408). If, however, the second resource score does meet the threshold, then the system 120 conducts a search of the second resources (410). Because a proper subset of second resources has already been searched for a query with confidence scores that do not meet the confidence threshold, the search need only be done on the remaining second resources that are not included in the proper subset. For example, as described above, the initial search was conducted for X % of the leaf nodes; thus, the search is now done for the remaining (100−X) % of the leaf nodes. Accordingly, by utilizing only X % of the leaf nodes to evaluate long tail queries, the system conserves significant resources, and only fully utilizes system resources for long tail queries that are determined to be highly related to the second resources based on the second resource score.

The process 400 determines an insertion score for search results for the second resources (416). The insertion score defines an ordinal insertion position at which second resource search results referencing second resources are to be inserted into a ranking of first resource search results referencing first resources. A process for determining the insertion score is described with reference to FIG. 6 below.

The process 400 then generates a search results resource for displaying second resource search results with first resource search results (418). The first resource search results are ranked according to the first search scores and displayed according to their respective ordinal positions in the ranking. The second resource search results are display at the ordinal insertion position. One example search results resource is depicted in FIG. 2B above.

Insertion Score

The insertion score defines an ordinal insertion position at which the search results for second resources are inserted into the ranked search results for first resources. For example, if the first resource search results have scores in a range of $1\text{-}2^N$, where the score represents a measure of relevance of a resource to the query, and N is an integer value, the insertion score will fall within this range. This ensures that the search results for the second resources can be processed for ranking in the same manner that search results for the first resources are processed. In other implementations, the insertion score can be the actual ordinal position at which the image display environment is to be displayed. For example, if a search results page displays N search results (N is typically 10, but can be any integer value), the insertion score may range from 1-N.

For a query that is not a long tail query, the insertion system 120 can determine an insertion score that is based, in part, on the search property ratio of the query. One example function for determining an insertion score based on an actual search property ratio is provided according to equation (1) below:

$$\text{Insertion\_Score}(Q) = f(\text{SPR}(Q), \text{IR}(\{I\})) \quad (1)$$

where

SPR(Q) is an actual search property ratio of the query determined from historical data; and IR({I}) is a score based on the quality scores of the images that are determined to be responsive to the query Q.

However, for queries that are not long tail queries, an insertion score computed from equation (1) may be noisy, as the search property ratio of the query may be noisy or even indeterminate. Accordingly, in some implementations, the insertion score for a long tail query is determined by equation (2):

$$\text{Insertion\_Score}(Q) = f(\text{ISPRs}[R, W]) \quad (2)$$

where

ISPRs[R, W] are the inferred search property ratios that include resource search property ratios and website search property ratios.

The inferred search property ratios can be determined in a variety of ways. In some implementations, a resource search property ratio of a resource is determined from actual search property ratios of queries for which search results referencing the resource were selected at a user device in response to the queries. Similarly, a website search property ratio is determined from the resource search property ratios of resources hosted by the website.

Figure 6:
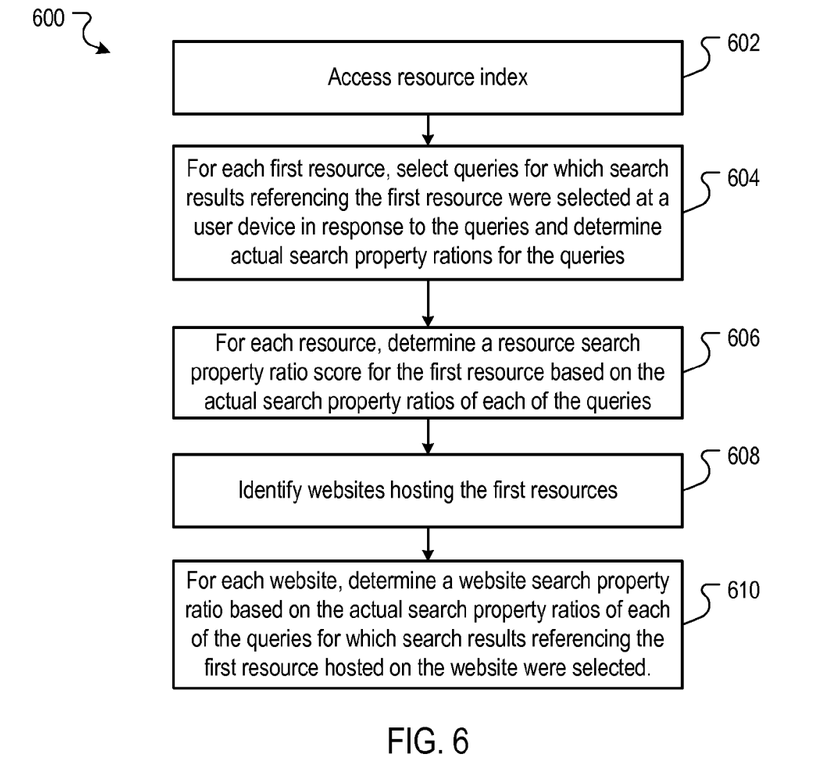
FIG. 6 is a flow diagram of an example process for determining resource and website search property ratios.

One example process by which document and website search property ratios can be determined is shown in FIG. 6, which is a flow diagram of an example process 600 for determining resource and website search property ratios.

The process 600 accesses an index of resources (602). For example, the insertion system 120 accesses the index 112, which indexes first resources.

For each first resource, the process 600 select queries for which search results referencing the first resource were selected at a user device in response to the queries and determine actual search property ratios for the queries (604). For example, if a particular resource was identified in a search result for a particular query Q and the search result was selected, then the query Q is selected.

For each resource, the process 600 determines a resource search property ratio score for the first resource based on the actual search property ratios of each of the queries (606). The resource search property ratio can, for example, be based on a central tendency of the search property ratios of the selected queries, e.g., an average or a median, for example.

The process 600 then identifies websites hosting resources (608). For each website, the process 600 determines a website search property ratio based on the actual search property ratios of each of the queries for which search results referencing the first resource hosted on the website were selected. In some implementations, the website search property ratio can be based on the resource search property ratios (e.g., an average or median of the resource search property ratios).

The website search property ratio can be used as a search property ratio of a new resource that is hosted by the website but for which very little search history is available. For example, assume a new web page is created on a web site that is very image intensive (e.g., a website hosting photos and stories regarding celebrities). As the majority of the pre-existing web pages on the web site have a relatively high resource search property ratio, the website search property ratio will likewise be relatively high. However, because very little search history is available for the new web page, a confidence measure for the resource search property ratio is low. The confidence measure may be based on, for example, a number of selections of the resource, a number of queries that have been used to identify the resource, or some other appropriate signal. A low confidence measure is indicative of the resource search property ratio being inaccurate, or being unable to be determined. Accordingly, the website search property ratio for the resource is used.

Once the inferred search property ratios are determined, they can be persisted to the index 112. Accordingly, the inferred search property ratios for resources that are determined to be responsive to a query can be used to determine an insertion score for long-tail queries. The insertion score for a long tail query is based on the inferred search property ratios of a proper subset of the top M ranked resources for the query. In some implementations, the insertion score is proportional to a ratio of a first number of resources in the proper subset of resources having a resource search property ratio meeting a resource search property ratio threshold to a second number that is equal to the cardinality of the proper subset of resources.

In other implementations, the insertion score can be based on a sigmoid that varies from 1–Z, where Z–1 is the cardinality of search results shown in a search results page. The sigmoid is centered about value J, where J is the number that is less than M. A number of the top ranked resources having a resource search property ratio of at least R is determined. The value of R may be less than or greater than 1, and can be selected by system administrators. As the number approaches J and surpasses J, the insertion score rapidly increases from Z to 1. That rate of the sigmoid can be determined by a scaling constant.

For example, if only J–5 of the resources have resource search property ratio that is at least 1.0, then the insertion score may be Z, meaning image search results are inserted at the bottom of a search results page that normally includes Z search results. If, however, J of the resources have resource search property ratio that is at least 1.0, then the insertion score may be approximately Z/2; likewise, if J+5 of the resources have a search property ratio that is at least 1.0, then the insertion score may be 2, or even 1.

In still other implementations, a proxy search property ratio can be determined for the long-tail query and the insertion score can be computed according to equation (1) above. For example, for a long tail query, the proxy search property ratio is based on one or more of the resource search property ratio scores of the selected resources and website search property ratios of websites on which the selected resources are hosted. The proxy search property ratio may, for example, be a central tendency of the inferred search property ratios of the top M ranked resources.

In some implementations, the insertion score for search results for a long tail query is a weighted score of a weighting of a first insertion score based on the actual search property ratio and a second insertion score based on the inferred search property ratios. As the query transitions out of the long tail, the weighting causes the first insertion score to become more authoritative in determining the insertion score. Conversely, for long tail queries, the second insertion score is more authoritative.

Figure 7:
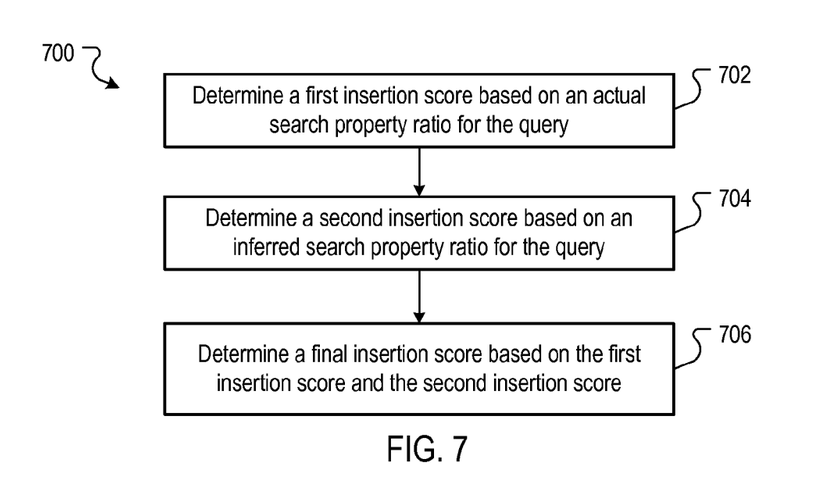
FIG. 7 is a flow diagram of an example process for determining a weighted insertion score for a query.

FIG. 7 is a flow diagram of an example process for determining a weighted insertion score for a query. The process 700 determines a first insertion score based on an actual search property ratio for the query (702). For example, for each query, equation (1) above may be used to determine the first insertion score.

The process 700 determines a second insertion score based on inferred search property ratios for the query (704). For example, the second insertion score may be determined by equation (2) above, utilizing the ratio function or the sigmoid function described above. Alternatively, a proxy search property ratio score may be determined for the query, and equation (1) may be used to determine the second insertion score.

The process 700 determines a final insertion score based on the first insertion score and the second insertion score (706). For example, the first insertion score may be weighted by a value that is proportional to a frequency of occurrence of the query, and the second insertion score may be weighted by a value that is proportional to a number of times the search results referencing resources in the proper subset of resources for the query have been selected. The weighting function may be such that the first weight becomes predominate as the history of the search query causes the search query to transition away from the long tail. This is because the actual search property ratio is considered to be a more accurate signal of the relatedness of a query to a particular resource type. Thus, no matter the selection history of particular resources, once the actual search property ratio of a query can be determined with a high degree of confidence, the corpus model 130 for that query become predominate in determining the insertion score.

Additional Features And Variations

In some implementations, the proxy search property ratio for a long tail query can be used as the second resource score as well. Thus, instead of the process 500 of FIG. 5, the second resource score is based on the proxy search property ratio.

The various examples of formulas and weighting schemes described above are illustrative only, and other appropriate formulas and weighting schemes can also be used. For example, only one of the first and second insertion scores may be selected according to a binary weighting scheme.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a data processing apparatus in data communication with an index of first and second resources, the first resources being resources that are different from the second resources, the method comprising:
  receiving queries for respective searches of the first resources;
  for each query, initiating a search of the first resources, and receiving, in response to the search, first search scores of the first resources, each first search score corresponding to a first resource and being indicative of the relevance of the first resource to the query;
  selecting, by the data processing apparatus, at least a proper subset of the queries and for each of the queries in the selected proper subset of queries determining a second resource score of the query, the second resource score of the query being determined independent of a search property ratio of the query;
  for each query in the proper subset of queries, comparing, by the data processing apparatus, the second resource score of the query to a second resource score threshold;
  for only each query having a second resource score that meets the second resource score threshold:
    initiating a search of the second resources for the query and receiving, in response to the search, second search scores of second resources in the proper subset of second resources, each second search score corresponding to a second resource and being indicative of the relevance of the second resource to the query;
    determining an insertion score that defines an ordinal insertion position at which second resource search results referencing second resources are to be inserted into a ranking of first resource search results referencing first resources; and
    generating a search results resource for displaying the first resource search results according to their respective ordinal positions in the ranking and the second resource search results at the ordinal insertion position;
  wherein:
    selecting at least a proper subset of the queries comprises selecting queries for which a confidence score of a search property ratio for the query does not meet a confidence score threshold, wherein the confidence score is a measure of accuracy of the search property ratio for the query; and
    the first resources are web page resources and the second resources are image resources.

2. The method of claim 1, wherein determining the second resource score of the query comprises:
initiating a search of only a proper subset of the second resources, and receiving, in response to the search, second search scores of second resources in the proper subset of second resources, each second search score corresponding to a second resource and being indicative of the relevance of the second resource to the query; and
determining, from the second search scores of the second resources, the second resource score for the query.

3. The method of claim 2, wherein determining, from the second search scores of the second resources, the second resource score for the query comprises:
determining a first number of web page resources that include a second resource in the proper subset of second resources that has a corresponding second search score that meets second search score threshold;
determining a second number of web page resources that include at least one of the second resources in the proper subset of second resources; and
determining the second resource score based on a ratio of the first number to the second number.

4. The method of claim 2, wherein determining, from the second search scores of the second resources, the second resource score for the query comprises:
determining a first number of web page resources that include a second resource in the proper subset of second resources that has a corresponding second search score that meets second search score threshold;
determining a second number of web page resources that are identified in response to the query; and
determining the second resource score based on a ratio of the first number to the second number.

5. The method of claim 3, wherein the second search score is a topicality score that is a measure of topical relatedness of the second resource to the query.

6. The method of claim 1, wherein:
each first resource has a resource search property ratio that is proportional search property ratios of queries for which a search result identifying the resource was selected; and
determining the second resource score of the query comprises determining, from a proper subset of resources that have the highest first search scores for the query, the second resource score from the resource search property ratio scores of the proper subset of resources.

7. A method implemented by a data processing apparatus in data communication with an index of first and second resources, the first resources being resources that are different from the second resources, the method comprising:
receiving queries for respective searches of the first resources;
for each query, initiating a search of the first resources, and receiving, in response to the search, first search scores of the first resources, each first search score corresponding to a first resource and being indicative of the relevance of the first resource to the query;
selecting, by the data processing apparatus, at least a proper subset of the queries and for each of the queries in the selected proper subset of queries determining a second resource score of the query, the second resource score of the query being determined independent of a search property ratio of the query;
for each query in the proper subset of queries, comparing, by the data processing apparatus, the second resource score of the query to a second resource score threshold;
for only each query having a second resource score that meets the second resource score threshold:
initiating a search of the second resources for the query and receiving, in response to the search, second search scores of second resources in the proper subset of second resources, each second search score corresponding to a second resource and being indicative of the relevance of the second resource to the query;
determining an insertion score that defines an ordinal insertion position at which second resource search results referencing second resources are to be inserted into a ranking of first resource search results referencing first resources; and
generating a search results resource for displaying the first resource search results according to their respective ordinal positions in the ranking and the second resource search results at the ordinal insertion position;
wherein:
selecting at least a proper subset of the queries comprises selecting queries for which a confidence score of a search property ratio for the query does not meet a confidence score threshold, wherein the confidence score is a measure of accuracy of the search property ratio for the query;
each first resource has a resource search property ratio score that is proportional search property ratios of queries for which a search result identifying the resource was selected; and
determining the insertion score comprises determining, from a proper subset of resources that have the highest first search scores for the query, the insertion score based on the resource search property ratio scores of the proper subset of resources.

8. A method implemented by a data processing apparatus in data communication with an index of first and second resources, the first resources being resources that are different from the second resources, the method comprising:
receiving queries for respective searches of the first resources;
for each query, initiating a search of the first resources, and receiving, in response to the search, first search scores of the first resources, each first search score corresponding to a first resource and being indicative of the relevance of the first resource to the query;
selecting, by the data processing apparatus, at least a proper subset of the queries and for each of the queries in the selected proper subset of queries determining a second resource score of the query, the second resource score of the query being determined independent of a search property ratio of the query;
for each query in the proper subset of queries, comparing, by the data processing apparatus, the second resource score of the query to a second resource score threshold;
for only each query having a second resource score that meets the second resource score threshold:
initiating a search of the second resources for the query and receiving, in response to the search, second search scores of second resources in the proper subset of second resources, each second search score corresponding to a second resource and being indicative of the relevance of the second resource to the query;
determining an insertion score that defines an ordinal insertion position at which second resource search results referencing second resources are to be inserted into a ranking of first resource search results referencing first resources; and generating a search results resource for displaying the first resource search results according to their respective ordinal positions in the ranking and the second resource search results at the ordinal insertion position;

wherein:

selecting at least a proper subset of the queries comprises selecting queries for which a confidence score of a search property ratio for the query does not meet a confidence score threshold, wherein the confidence score is a measure of accuracy of the search property ratio for the query;

each first resource has a resource search property ratio score that is proportional search property ratios of queries for which a search result identifying the resource was selected, and further comprising, for each query having a second resource score that meets the second resource score threshold:

determining an actual search property ratio of the query that is proportional to a number of times the query was submitted for a search of the second resources to a number of times that the search query was submitted for a search of the first resources; and determining the insertion score comprises determining the insertion score based on a first insertion score that is proportional to the actual search property ratio and a first weighting value and a second insertion score from a proper subset of resources that have the highest first search scores for the query and based on the resource search property ratio scores of the proper subset of resources and a second weighting value.

9. The method of claim 8, wherein the first weighting value is proportional to a frequency of occurrence of the query, and the second weighting value is proportional to a number of times search results referencing the resources in the proper subset of resources that have the highest first search scores for the query have been selected.

10. The method of claim 8, further comprising determining the second insertion score based on a ratio of a first number of resources in the proper subset of resources having a resource search property ratio meeting a resource search property ratio threshold to a second number that is equal to the cardinality of the proper subset of resources.

11. A method implemented by a data processing apparatus, comprising:

accessing an index of first and second resources, the first resources being resources that are different from the second resources;

for each indexed first resource:

selecting, from a query log, queries for which search results referencing the first resource were selected at a user device in response to the queries;

for each of the queries, accessing data specifying an actual search property ratio for the query, the actual search property ratio being a ratio of a first number of times the query was used to search first resources and a second number of times the query was used to search second resources; and determining, by the data processing apparatus, a resource search property ratio score for the first resource based on the actual search property ratios of each of the queries;

identifying websites hosting the first resources, each website hosting one or more of the first resources; and determining, for each of the websites, a website search property ratio based on the actual search property ratios of each of the queries for which search results referencing the first resource hosted on the website were selected;

receiving a query for a search of the first resources;

selecting at least a proper subset of resources that are determined to be responsive to the query;

determining an actual search property ratio of the query that is proportional to a number of times the query was submitted for a search of the second resources to a number of times that the search query was submitted for a search of the first resources; and determining an insertion score based on a first insertion score that is proportional to the actual search property ratio and a first weighting value and a second insertion score from a proper subset of resources that have the highest first search scores for the query and based on the resource search property ratio scores of the proper subset of resources and a second weighting value.

12. The method of claim 11, wherein the first weighting value is proportional to a frequency of occurrence of the query, and the second weighting value is proportional to a number of times the search results referencing resources in the proper subset of resources query have been selected.

13. The method of claim 11, further comprising:

receiving a query for a search of the first resources;

selecting at least a proper subset of resources that are determined to be responsive to the query; and determining, for the query, an insertion score for the query, the insertion score based on a ratio of a first number of resources in the proper subset of resources having a resource search property ratio meeting a resource search property ratio threshold to a second number that is equal to the cardinality of the proper subset of resources.

14. A system, comprising:

a data processing apparatus in data communication with an index of first and second resources, the first resources being resources that are different from the second resources;

a non-transitory memory in data communication with the data processing apparatus and storing instructions executable by the data processing apparatus and that upon such execution cause the data processing apparatus to perform operations comprising:

receiving queries for respective searches of the first resources;

for each query, initiating a search of the first resources, and receiving, in response to the search, first search scores of the first resources, each first search score corresponding to a first resource and being indicative of the relevance of the first resource to the query;

selecting at least a proper subset of the queries and for each of the queries in the selected proper subset of queries determining a second resource score of the query, the second resource score of the query being determined independent of a search property ratio of the query;

for each query in the proper subset of queries, comparing the second resource score of the query to a second resource score threshold;

for only each query having a second resource score that meets the second resource score threshold:

initiating a search of the second resources for the query and receiving, in response to the search, second search scores of second resources in the proper subset of second resources, each second search score corresponding to a second resource and being indicative of the relevance of the second resource to the query;

determining an insertion score that defines an ordinal insertion position at which second resource search results referencing second resources are to be inserted into a ranking of first resource search results referencing first resources; and generating a search results resource for displaying the first resource search results according to their respective ordinal positions in the ranking and the second resource search results at the ordinal insertion position;

wherein:

selecting at least a proper subset of the queries comprises selecting queries for which a confidence score of a search property ratio for the query does not meet a confidence score threshold, wherein the confidence score is a measure of accuracy of the search property ratio for the query; and the first resources are web page resources and the second resources are image resources.

15. A non-transitory memory device in data communication with a data processing apparatus and storing instructions executable by the data processing apparatus and that upon such execution cause the data processing apparatus to perform operations comprising:

receiving queries for respective searches of the first resources;

for each query, initiating a search of the first resources, and receiving, in response to the search, first search scores of the first resources, each first search score corresponding to a first resource and being indicative of the relevance of the first resource to the query;

selecting at least a proper subset of the queries and for each of the queries in the selected proper subset of queries determining a second resource score of the query, the second resource score of the query being determined independent of a search property ratio of the query;

for each query in the proper subset of queries, comparing the second resource score of the query to a second resource score threshold;

for only each query having a second resource score that meets the second resource score threshold:

initiating a search of the second resources for the query and receiving, in response to the search, second search scores of second resources in the proper subset of second resources, each second search score corresponding to a second resource and being indicative of the relevance of the second resource to the query;

determining an insertion score that defines an ordinal insertion position at which second resource search results referencing second resources are to be inserted into a ranking of first resource search results referencing first resources; and generating a search results resource for displaying the first resource search results according to their respective ordinal positions in the ranking and the second resource search results at the ordinal insertion position;

wherein:

selecting at least a proper subset of the queries comprises selecting queries for which a confidence score of a search property ratio for the query does not meet a confidence score threshold, wherein the confidence score is a measure of accuracy of the search property ratio for the query; and the first resources are web page resources and the second resources are image resources.

* * * * *